2,930,789

POLYMERIZATION OF OLEFINES WITH A CATALYST OF CHROMIUM OXIDE ON ALUMINUM ORTHOPHOSPHATE

Horst Kerber, Ludwigshafen (Rhine), and Rolf Platz, Mannheim, Germany, assignors to Badische Anilin- & Soda-Fabrik Aktiengesellschaft, Ludwigshafen (Rhine), Germany No Drawing. Application October 14, 1957
Serial No. 689,756

4 Claims. (Cl. 260—94.9)

This invention relates to an improved process for the polymerization of olefines with a solid catalyst containing chromium oxide as active ingredient.

It is already known that mono- and di-olefines can be polymerized with suitable solid catalysts at increased pressure and elevated temperature to solid wax-like or liquid hydrocarbons. As catalysts there are used activated metal oxides of the 6th sub-group of the periodic system with aluminum oxide or aluminum silicates as carrier material. In this process difficulties occur because the solid catalyst becomes coated during the reaction with high molecular products the complete removal of which is not possible with liquid hydrocarbons. In a continuous operation, the catalyst therefore becomes inactive relatively quickly, cracks and contaminates the polymers with catalyst sludge.

We have now found that olefins can be polymerized in an advantageous manner with the aid of a solid catalyst by carrying out the polymerization in the presence of a chromium oxide catalyst applied to aluminum orthophosphate. Such a solid catalyst may readily be separated from the polymer formed because it is soluble both in acids and alkalies. A further advantage of the process according to this invention is to be seen in the fact that the catalyst can be recovered from the aqueous solution of the alkali or acid by neutralization.

The solid catalyst to be used according to this invention may be prepared for example by impregnation of aluminum phosphate with aqueous chromic acid solutions. For this purpose finely-particled aluminum orthophosphate with particle sizes between 0.5 and 10 millimetres may be treated with for example 0.1 to 1 molar aqueous solution of chromium-6-oxide. The solid catalyst separated from the impregnation solution is heated to high temperatures, for instance a temperature between 150 and 800° C. for activation either directly in the moist state or after a preliminary drying. If this heating is carried out in a current of air, temperatures between 350 and 600° C. and heating periods of 5 to 12 hours are advantageous. The catalyst may, however, also be activated at lower temperatures in a stream of hydrogen, preferably at temperatures between 150 and 300° C. By the heat treatment the hexavalent chromium is partly reduced to trivalent chromium.

Other methods for preparing the catalyst to be used according to this invention are for instance the dry mixing of the carrier with dry chromium trioxide or the treatment of the carrier with aqueous solutions of chromium salts such as chromium nitrate and chromium sulfate. While using one of these methods for manufacturing the catalyst it is important to treat the catalyst in such a manner that it contains under the reaction conditions at least about 0.1% of the chromium with reference to the total weight of the catalyst in the hexavalent form. The hexavalent chromium can be obtained for instance if salts of the trivalent chromium are employed as initial materials by heating the impregnated carrier in an oxidizing atmosphere to higher temperatures. The total chromium content of the catalyst is preferably adjusted so that it lies at about 1 to 10% of chromium with reference to the total weight of the solid catalyst.

Olefines which can be polymerized or copolymerized according to this invention are for example ethylene, propylene, 1-butene and other short-chained mono- or di-olefines containing a double bond in $\alpha$-position and having no branching closer to the double bond than in 4-position. Favorable polymerization temperatures lie at 40 to 250° C., but preferably between 65 and 100° C. The reaction can be carried out at atmospheric pressure. It is, however, advantageous to work with superatmospheric pressure, preferably with pressures higher than 10 atmospheres. The addition of indifferent diluents to the reaction system is of advantage. Indifferent solvents which are liquid at room temperature, as for example liquid saturated aliphatic hydrocarbons, such as cyclohexane, pentane, hexane, heptane or octane, are especially suitable as diluents. While it is possible to carry out this reaction in the gaseous phase the liquid phase reaction is the preferred. The ratio between catalyst and diluent may be greatly varied and should preferably lie between 1:5 and 1:15.

The process may be carried out batchwise or continuously. In discontinuous operation, the catalyst and the diluent are preferably placed in a pressure vessel and the olefine to be polymerized led into the reaction vessel at the rate at which it is used up. In the continuous process the monomers and an indifferent solvent together with the catalyst can be pumped through a reaction chamber one or more times in cocurrent or countercurrent. Good conversions may also be achieved by causing monomers dissolved in an indifferent diluent to polymerize over a rigidly-arranged catalyst in the trickling or sump methods.

For separation of the solid catalyst, the polymer may be treated with a base, such as dilute alkalies and/or with acids, preferably at temperatures between 100 and 150° C. There come into question for this purpose, for example caustic soda solution, caustic potash solution, hydrochloric acid, sulfuric acid and hydrofluoric acid, the concentration of which is adjusted so that it is about 1–12 normal, but preferably 1 to 5 normal. Moreover it is preferable to add an inert liquid organic solvent, such as an aliphatic or cycloaliphatic hydrocarbon, as for example iso-octane, normal octane, heptane or cyclohexane.

The polymers prepared according to this invention are practically free from ash.

The following example will further illustrate this invention but the invention is not restricted to this example. The parts specified in the example are parts by weight.

Example

For the preparation of the catalyst there is used pulverized aluminum orthophosphate which is shaped into strings 4 millimetres in diameter and then dried for 5 hours at 200° C. 500 parts of the phosphate moldings thus pretreated are added to 1,000 parts of an 0.8-molar aqueous chromic acid solution and left there for 12 hours at room temperature. After separating the liquid phase, the solid substance, which is now colored yellow, is charged into a reaction tube and activated by heating at 500° C. for 8 hours. The catalyst, now green in color, can be used directly for the polymerization.

35 parts of the aluminum phosphate-chromium oxide catalyst prepared in the said manner are charged into a shaking autoclave of stainless steel together with 250 parts of iso-octane. The autoclave is rinsed out with nitrogen and then placed under an ethylene pressure of 40 atmospheres. The autoclave is then slowly heated to 85° C. At 57° C. the pressure in the autoclave has risen to 62 atmospheres. From 78° C. a clear pressure drop to 22 atmospheres can be observed. The ethylene used up is replaced and a pressure of 85 atmospheres maintained in the autoclave. The polymerization proceeds rapidly. After cooling and releasing the pressure, a solid block consisting of polyethylene and solid catalyst containing iso-octane can be removed from the autoclave.

The comminuted reaction mass is added to a pressure vessel, 500 parts of 2-normal caustic soda solution and 1,000 parts of isooctane are added and the whole heated at 130° C. for 18 hours while stirring. After cooling, the polyethylene separates as a soft readily comminutable mass on the surface. It is separated and washed first with methanolic hydrochloric acid and then with hot methanol until the filtrate has a neutral reaction. 250 parts of a white, solid, film-forming polyethylene are obtained which softens at temperatures between 125 and 133° C.

We claim:

1. In a process for the polymerization of an olefin containing up to 4 carbon atoms with a solid catalyst containing a chromium oxide, the improvement which comprises conducting the polymerization in the presence of a catalyst composition consisting essentially of a chromium oxide supported on aluminum orthophosphate carrier, said catalyst composition containing, in proportions by weight of the total composition, about 1% to 10% of total chromium content and at least about 0.1% of hexavalent chromium.

2. A process as claimed in claim 1 wherein the catalyst has been activated by heating to a temperature between 150° C. and 800° C.

3. A process as claimed in claim 1 wherein the polymerization is carried out at a temperature between 40° C. and 250° C.

4. In a process for the polymerization of ethylene with a solid catalyst containing a chromium oxide, the improvement which comprises conducting the polymerization at a temperature between 40° C. and 250° C. in the presence of a catalyst composition consisting essentially of a chromium oxide supported on aluminum orthophosphate carrier, said catalyst composition containing, in proportions by weight of the total composition, about 1% to 10% of total chromium content and at least about 0.1% of hexavalent chromium.

References Cited in the file of this patent

UNITED STATES PATENTS

| | | |
|---|---|---|
| 2,613,134 | Elmore | Oct. 7, 1952 |
| 2,691,647 | Field et al. | Oct. 12, 1954 |
| 2,825,721 | Hogan et al. | Mar. 4, 1958 |